(12) United States Patent
Holcomb

(10) Patent No.: US 7,961,786 B2
(45) Date of Patent: *Jun. 14, 2011

(54) SIGNALING FIELD TYPE INFORMATION

(75) Inventor: Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1169 days.

This patent is subject to a terminal disclaimer.

(21) Appl. No.: 10/989,574

(22) Filed: Nov. 15, 2004

(65) Prior Publication Data

US 2005/0100093 A1    May 12, 2005

Related U.S. Application Data

(63) Continuation-in-part of application No. 10/933,880, filed on Sep. 2, 2004, now Pat. No. 7,606,308, which is a continuation-in-part of application No. 10/857,473, filed on May 27, 2004, now Pat. No. 7,567,617.

(60) Provisional application No. 60/501,081, filed on Sep. 7, 2003.

(51) Int. Cl.
H04N 7/12 (2006.01)

(52) U.S. Cl. .................................. 375/240.12

(58) Field of Classification Search .............. 375/240.15
See application file for complete search history.

(56) References Cited

U.S. PATENT DOCUMENTS

| | | | |
|---|---|---|---|
| 4,849,812 A | 7/1989 | Borgers et al. | |
| 4,954,892 A | 9/1990 | Asai et al. | |
| 5,027,206 A | 6/1991 | Vreeswijk et al. | |
| 5,091,782 A | 2/1992 | Krause et al. | |
| 5,175,618 A | 12/1992 | Ueda et al. | |
| 5,191,436 A | 3/1993 | Yonemitsu | |
| 5,212,549 A | 5/1993 | Ng et al. | |
| 5,223,949 A | 6/1993 | Honjo | |
| 5,235,618 A | 8/1993 | Sakai et al. | |
| 5,291,486 A | 3/1994 | Koyanagi | |
| 5,301,242 A | 4/1994 | Gonzales et al. | |
| 5,343,248 A | 8/1994 | Fujinami | |
| 5,365,552 A | 11/1994 | Astle | |
| 5,422,676 A | 6/1995 | Herpel et al. | |
| 5,426,464 A | 6/1995 | Casavant et al. | |
| 5,461,420 A * | 10/1995 | Yonemitsu et al. | 375/240.15 |
| 5,491,516 A | 2/1996 | Casavant et al. | |

(Continued)

FOREIGN PATENT DOCUMENTS

EP    0599529    6/1994

(Continued)

OTHER PUBLICATIONS

"DivX Multi Standard Video Encoder," 2 pp. (Downloaded from the World Wide Web on Jan. 24, 2006).

(Continued)

Primary Examiner — Jayanti K Patel
Assistant Examiner — Richard Torrente
(74) Attorney, Agent, or Firm — Klarquist Sparkman, LLP

(57) ABSTRACT

Techniques and tools for signaling of field type information for interlaced video frames are described. For example, a video decoder receives a code for an interlaced video frame that has two fields. The code represents information that jointly indicates field types for the two fields and an order for the field types. The decoder decodes the code. A video encoder performs corresponding encoding and signaling.

21 Claims, 8 Drawing Sheets

| FPTYPE FLC | First Field Picture Type | Second Field Picture Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

U.S. PATENT DOCUMENTS

| | | | |
|---|---|---|---|
| 5,510,840 A * | 4/1996 | Yonemitsu et al. | 375/240.15 |
| 5,539,466 A | 7/1996 | Igarashi et al. | |
| 5,541,852 A | 7/1996 | Eyuboglu et al. | |
| 5,543,847 A | 8/1996 | Kato | |
| 5,566,208 A | 10/1996 | Balakrishnan | |
| 5,600,376 A | 2/1997 | Casavant et al. | |
| 5,606,539 A | 2/1997 | De Haan et al. | |
| 5,608,697 A | 3/1997 | De Haan et al. | |
| 5,691,771 A | 11/1997 | Oishi et al. | |
| 5,699,476 A | 12/1997 | Van Der Meer | |
| 5,740,310 A | 4/1998 | De Haan et al. | |
| 5,784,107 A | 7/1998 | Takahashi | |
| RE36,015 E | 12/1998 | Iu | |
| 5,844,867 A | 12/1998 | De Haan et al. | |
| 5,874,995 A | 2/1999 | Naimpally et al. | |
| 5,933,451 A | 8/1999 | Ozkan et al. | |
| 5,946,043 A | 8/1999 | Lee et al. | |
| 5,952,943 A | 9/1999 | Walsh et al. | |
| 5,970,173 A | 10/1999 | Lee et al. | |
| RE36,507 E | 1/2000 | Iu | |
| 6,060,997 A | 5/2000 | Taubenheim et al. | |
| 6,088,063 A | 7/2000 | Shiba | |
| 6,101,195 A | 8/2000 | Lyons et al. | |
| 6,141,053 A | 10/2000 | Saukkonen | |
| 6,160,849 A | 12/2000 | Igarashi et al. | |
| 6,198,773 B1 | 3/2001 | Gill et al. | |
| 6,233,226 B1 | 5/2001 | Gringeri et al. | |
| RE37,222 E | 6/2001 | Yonemitsu et al. | |
| 6,282,245 B1 | 8/2001 | Oishi et al. | |
| 6,295,321 B1 | 9/2001 | Lyu | |
| 6,324,216 B1 | 11/2001 | Igarashi et al. | |
| 6,370,276 B2 | 4/2002 | Boon | |
| 6,408,096 B2 | 6/2002 | Tan | |
| 6,441,813 B1 | 8/2002 | Ishibashi | |
| 6,459,811 B1 | 10/2002 | Hurst, Jr. | |
| 6,499,060 B1 | 12/2002 | Wang et al. | |
| 6,556,627 B2 | 4/2003 | Kitamura et al. | |
| 6,593,392 B2 | 7/2003 | Wang | |
| 6,654,420 B1 | 11/2003 | Snook | |
| 6,671,323 B1 | 12/2003 | Tahara et al. | |
| 6,728,317 B1 | 4/2004 | Demos | |
| 6,775,840 B1 | 8/2004 | Naegel et al. | |
| 6,792,048 B1 | 9/2004 | Lee et al. | |
| 6,842,485 B2 | 1/2005 | Monda et al. | |
| 6,873,629 B2 | 3/2005 | Morris | |
| 7,010,046 B2 | 3/2006 | Trevers et al. | |
| 7,064,790 B1 | 6/2006 | Varma et al. | |
| 7,227,895 B1 * | 6/2007 | Wang et al. | 375/240.16 |
| 7,298,303 B2 | 11/2007 | Kobayashi et al. | |
| 7,609,762 B2 | 10/2009 | Crinon et al. | |
| 2001/0010708 A1 | 8/2001 | Nakazawa | |
| 2001/0055469 A1 | 12/2001 | Sheda et al. | |
| 2002/0001348 A1 | 1/2002 | Yiwen et al. | |
| 2002/0012394 A1 | 1/2002 | Hatano et al. | |
| 2002/0061067 A1 | 5/2002 | Lyons et al. | |
| 2002/0061073 A1 | 5/2002 | Huang et al. | |
| 2002/0080875 A1 | 6/2002 | Tahara et al. | |
| 2002/0191712 A1 | 12/2002 | Gaddam et al. | |
| 2002/0196857 A1 | 12/2002 | Kono et al. | |
| 2003/0053416 A1 | 3/2003 | Ribas-Corbera et al. | |
| 2003/0113026 A1 | 6/2003 | Srinivasan et al. | |
| 2003/0137600 A1 | 7/2003 | Chen et al. | |
| 2003/0185298 A1 | 10/2003 | Alvarez et al. | |
| 2003/0202590 A1 | 10/2003 | Gu et al. | |
| 2003/0231593 A1 | 12/2003 | Bauman et al. | |
| 2004/0042673 A1 | 3/2004 | Boon | |
| 2004/0130619 A1 | 7/2004 | Lin | |
| 2004/0142699 A1 | 7/2004 | Jollota et al. | |
| 2004/0255063 A1 | 12/2004 | Crinon et al. | |
| 2005/0074061 A1 | 4/2005 | Ribas-Corbera et al. | |
| 2005/0083218 A1 | 4/2005 | Regunathan et al. | |
| 2005/0135484 A1 | 6/2005 | Lee et al. | |
| 2005/0147167 A1 | 7/2005 | Dumitras et al. | |
| 2005/0152457 A1 | 7/2005 | Regunathan et al. | |
| 2005/0200758 A1 * | 9/2005 | Monahan et al. | 348/526 |
| 2006/0013568 A1 | 1/2006 | Rodriguez | |
| 2006/0143678 A1 | 6/2006 | Chou et al. | |
| 2007/0153918 A1 | 7/2007 | Rodriguez | |

FOREIGN PATENT DOCUMENTS

| | | |
|---|---|---|
| EP | 0 852 445 | 8/1998 |
| JP | 62032725 | 2/1987 |
| JP | 1049388 | 2/1989 |
| JP | 4207684 | 7/1992 |
| JP | 04-297179 | 10/1992 |
| JP | 5236457 | 9/1993 |
| JP | 6030394 | 2/1994 |
| JP | 08-223385 | 8/1996 |
| JP | 09-261266 | 10/1997 |
| JP | 10-294757 | 11/1998 |
| JP | 2000165866 | 6/2000 |
| JP | 2000-286865 | 10/2000 |
| JP | 2001-109686 | 4/2001 |
| JP | 2001-169261 | 6/2001 |
| WO | WO 00/30356 | 5/2000 |

OTHER PUBLICATIONS

Sullivan et al., "The H.264/AVC Advanced Video Coding Standard: Overview and Introduction to the Fidelity Range Extensions," 21 pp. (Aug. 2004).

Wien, "Variable Block-Size Transforms for Hybrid Video Coding," Dissertation, 182 pp. (Feb. 2004).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Joint Final Committee Draft (JFCD) of Joint Video Specification," JVT-D157, 207 pp. (Aug. 2002).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook "Next-Gen Windows Media Player Leaks to the Web," *BetaNews*, 17 pp. (Jul. 2002) [Downloaded from the World Wide Web on Aug. 8, 2003].

Borgwardt, "Core Experiment on Interlaced Video Coding," ITU Study Group 16 Question 16, VCEG-N85, 10 pp. (Oct. 2001).

U.S. Appl. No. 60/501,133, filed Sep. 2003, Holcomb et al.

Anonymous, International Search Report in Corresponding EP Application No. EP 02 01 9056, 4 pp. (Aug. 2003).

ISO/IEC JVT-G050r1 (Draft ITU-T Rec. H.264), "Joint Video Specification," 286 pp. (May 2003).

Joint Video Team of ISO/IEC MPEG and ITU-T VCEG, "Final Joint Committee Draft of Joint Video Specification (ITU-T Recommendation H.264, ISO/IEC 14496-10 AVC)," 217 pp. (Jul. 2002).

SMPTE, "Proposed SMPTE Standard for Television: VC-9 Compressed Video Bitstream Format and Decoding Process," Working Draft 2, 365 pp. (Oct. 2003).

* cited by examiner

Figure 1, prior art
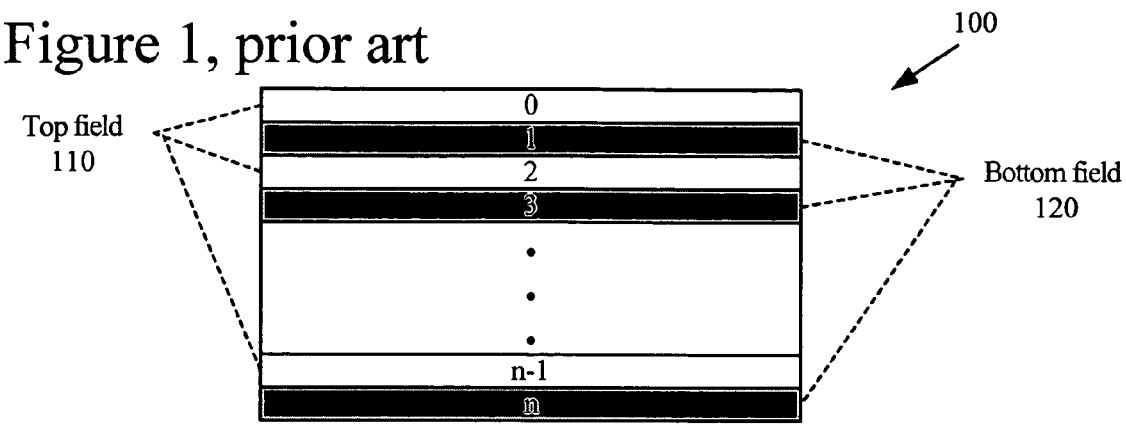
Figure 2A, prior art
| PTYPE FLC | Picture Type |
|---|---|
| 0 | I |
| 1 | P |
Figure 2B, prior art
| PTYPE VLC | Picture Type |
|---|---|
| 1 | P |
| 01 | I |
| 00 | B |
Figure 3
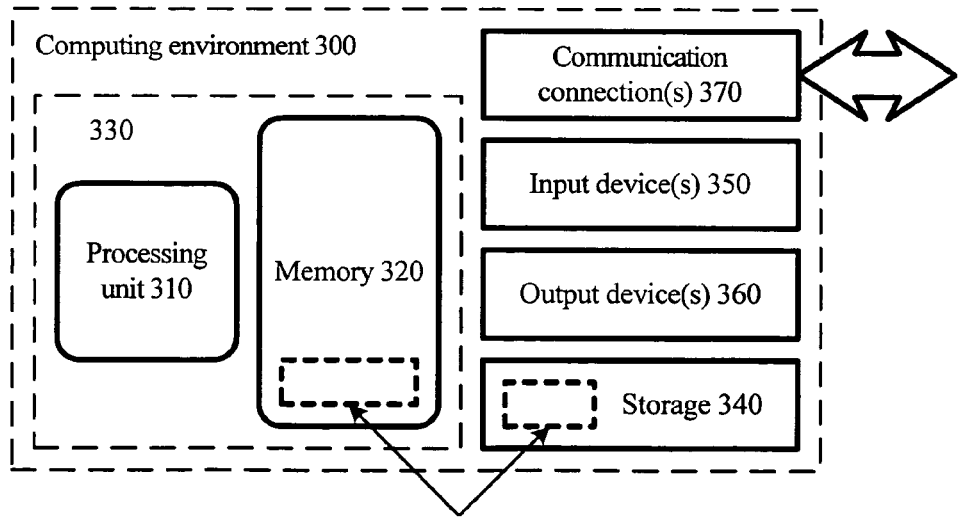
Software 380 implementing video encoder and/or decoder with joint signaling of field types for both fields of an interlaced video frame Frame Layer Bitstream Syntax for Interlaced Fields

Figure 10A

| FCM | Picture Coding Type |
|---|---|
| 0 | Progressive |
| 10 | Frame-Interlace |
| 11 | Field-Interlace |

Figure 10B

| FPTYPE FLC | First Field Picture Type | Second Field Picture Type |
|---|---|---|
| 000 | I | I |
| 001 | I | P |
| 010 | P | I |
| 011 | P | P |
| 100 | B | B |
| 101 | B | BI |
| 110 | BI | B |
| 111 | BI | BI |

Figure 10C

| PTYPE VLC | Picture Type |
|---|---|
| 110 | I |
| 0 | P |
| 10 | B |
| 1110 | BI |
| 1111 | Skipped |

SIGNALING FIELD TYPE INFORMATION

RELATED APPLICATION INFORMATION

This application is a continuation-in-part of U.S. patent application Ser. No. 10/933,880, filed Sep. 2, 2004, which claims the benefit of U.S. Provisional Patent Application No. 60/501,081, filed Sep. 7, 2003, and which is a continuation-in-part of U.S. patent application Ser. No. 10/857,473, filed May 27, 2004, which also claims the benefit of U.S. Provisional Patent Application No. 60/501,081, filed Sep. 7, 2003, the disclosures of which are hereby incorporated by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Techniques and tools for signaling of field type information are described. For example, a video encoder jointly signals field type information for both fields of an interlaced video frame, and a video decoder decodes the signaled information.

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. For instance, a pixel may include an eight-bit luminance sample (also called a luma sample, as the terms "luminance" and "luma" are used interchangeably herein) that defines the grayscale component of the pixel and two eight-bit chrominance samples (also called chroma samples, as the terms "chrominance" and "chroma" are used interchangeably herein) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to a preceding and/or following frame (typically called a reference or anchor frame) or frames (for B-frames).

I. Interlaced Video and Progressive Video

A video frame contains lines of spatial information of a video signal. For progressive video, these lines contain samples starting from one time instant and continuing in raster scan fashion (left to right, top to bottom) through successive, non-alternating lines to the bottom of the frame. A progressive I-frame is an intra-coded progressive video frame. A progressive P-frame is a progressive video frame coded using forward prediction, and a progressive B-frame is a progressive video frame coded using bi-directional prediction.

The primary aspect of interlaced video is that the raster scan of an entire video frame is performed in two passes by scanning alternate lines in each pass. For example, the first scan is made up of the even lines of the frame and the second scan is made up of the odd lines of the scan. This results in each frame containing two fields representing two different time epochs. FIG. 1 shows an interlaced video frame (100) that includes top field (110) and bottom field (120). In the frame (100), the even-numbered lines (top field) are scanned starting at one time (e.g., time t), and the odd-numbered lines (bottom field) are scanned starting at a different (typically later) time (e.g., time t+1). This timing can create jagged tooth-like features in regions of an interlaced video frame where motion is present when the two fields are scanned starting at different times. For this reason, interlaced video frames can be rearranged according to a field structure for coding, with the odd lines grouped together in one field, and the even lines grouped together in another field. This arrangement, known as field coding, is useful in high-motion pictures for reduction of such jagged edge artifacts. On the other hand, in stationary regions, image detail in the interlaced video frame may be more efficiently preserved without such a rearrangement. Accordingly, frame coding is often used in stationary or low-motion interlaced video frames, in which the original alternating field line arrangement is preserved.

II. Signaling Frame Type Information in Windows Media Video, Version 9

Microsoft Corporation's Windows Media Video, Version 9 ["WMV9"] includes a video encoder and a video decoder. The encoder and decoder may process progressive or interlaced video content.

For a video sequence, a one-bit sequence-layer syntax element INTERLACE specifies whether the video data is coded in progressive or interlaced mode. If INTERLACE=0, then the video frames are coded in progressive mode. If INTERLACE=1, then the video frames are coded in interlaced mode. Another sequence-layer syntax element NUMBFRAMES is a three-bit field that indicates the number of consecutive B-frames between I- or P-frames. If NUMBFRAMES=0, then there are no B-frames in the video sequence.

A compressed video frame is made up of data structured into three hierarchical layers. From top to bottom the layers are: picture, macroblock, and block. For a frame, a picture-layer syntax element PTYPE indicates whether the frame is an I-frame, P-frame, or B-frame. If NUMBFRAMES=0, then only I- and P-frames are present in the sequence, and PTYPE is a signaled with a fixed-length code ["FLC"] as shown in FIG. 2A. If NUMBFRAMES is greater than 0, then B-frames are present in the sequence, and PTYPE is a variable-length code ["VLC"] indicating the picture type of the frame, as shown in FIG. 2B. Thus, the INTERLACE, NUMB-FRAMES, and PTYPE elements collectively may indicate the following types of frames: progressive I-frame, interlaced I-frame, progressive P-frame, interlaced P-frame, progressive B-frame, and interlaced B-frame.

While the encoder and decoder are efficient for many different scenarios and types of content, there is room for improvement in several places. In particular, the encoder and decoder cannot process interlaced video frames as separate fields. Instead, the encoder and decoder process interlaced video frames using frame coding/decoding. A macroblock of an interlaced video frame includes alternating lines from both fields of the frame. The macroblock itself may be frame-coded or field-coded, but separate coding of top and bottom fields as separate pictures is not allowed. This limits interoperability with codecs that comply with certain international standards. In addition, coding interlaced video with frame coding can be inefficient for certain kinds of content (e.g., high-motion video).

III. Signaling Picture Type Information According to Various Standards

Aside from previous WMV encoders and decoders, several international standards relate to video compression and decompression. These standards include the Motion Picture Experts Group ["MPEG"] 1, 2, and 4 standards and the H.261, H.262 (another name for MPEG 2), H.263, and H.264 standards from the International Telecommunication Union ["ITU"]. An encoder and decoder complying with one of these standards typically use a combination of intra-picture and inter-picture compression and decompression. The different standards describe different signaling mechanisms for picture type information.

A. H.262 Standard

According to the H.262 standard, a progressive video frame is coded as a frame picture, and the two fields of an interlaced video frame may be coded together (as a frame picture) or as separate fields (as field pictures). [H.262 standard, section 6.1.1.1.] The three picture types are I-, P-, and B-pictures. [H.262 standard, section 6.1.1.5.]

Various rules address combinations of field pictures for interlaced video frames in the H.262 standard. [H.262 standard, section 6.1.1.4.1.] When the first picture of a coded frame is a P-field picture, the second picture of the frame is a P-field picture. When the first picture of a coded frame is a B-field picture, the second picture of the frame is a B-field picture. When the first picture of a coded frame is an I-field picture, the second picture of the frame is either an I-field picture or a P-field picture. [Id.]

A sequence-layer syntax element "progressive_sequence," when set to 1, indicates the sequence contains only progressive frame pictures. [H.262 standard, section 6.3.5.] When progressive_sequence is set to 0, the sequence may contain both frame pictures and field pictures, and the frame pictures may be progressive or interlaced frames. [Id.]

In a picture header, a three-bit FLC "picture_coding_jype" identifies whether a picture is an I-picture, P-picture or B-picture. [H.262 standard, section 6.3.9.] Also signaled for a picture, the "picture_structure" element is a two-bit FLC that indicates whether the picture is a top field (field picture), bottom field (field picture), or frame picture (either progressive or interlaced). [H.262 standard, section 6.3.10.] A one-bit element "progressive_frame" signaled for a picture indicates whether two fields of a frame are interlaced fields or are actually from the same time instant as one another.

The signaling of picture type information described in the H.262 standard may be efficient for certain scenarios and types of content. For field pictures of interlaced video frames, however, the signaling of type information uses an inefficient amount of bits.

B. H.264 Standard

According to draft JVT-D157 of the H.264 standard, a slice is a number of macroblocks in a picture. A particular picture (either video frame or field) may include multiple slices. Or, the picture may include a single slice.

In the slice header for a slice, the syntax element "pic_structure" identifies the picture structure for the slice as progressive frame picture, top field picture, bottom field picture, interlaced frame picture whose top field precedes its bottom field in time, or interlaced frame picture whose bottom field precedes its top field in time. The pic_structure element is signaled as an unsigned integer Exp-Golomb-coded syntax element, which is a kind of VLC.

Also in the slice header for a slice, the syntax element "slice_type_idc" indicates the coding type of the slice as Pred (P-slice), BiPred (B-slice), Intra (I-slice), SPred (SP-slice), or Sintra (SI-slice). The slice_type_idc element is also signaled as an unsigned integer Exp-Golomb-coded syntax element.

C. Other Standards

According to the H.261 standard, a PTYPE element signals information about a completed picture (e.g., source video format) and an MTYPE element signals whether a macroblock is intra- or inter-coded. The H.261 standard does not address interlaced coding modes. Moreover, the H.261 standard does not have picture types such as I, P, and B.

The H.263 and MPEG-1 standards describe picture types (e.g., I, P, B, PB, EI, or EP in H.263; I, P, B, or D in MPEG-1) signaled per frame. These standards do not address interlaced coding modes, however.

According to the MPEG-4 standard, a VOP_coding_type element signaled per video object plane ["VOP"] indicates whether the VOP is of coding type I, P, B, or S. A VOP may contain interlaced video, but interlaced VOPs are frame coded, not field coded as separate fields.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for signaling of field type information for field-coded interlaced video frames. The described techniques and tools include, but are not limited to, the following:

A tool such as a video decoder receives and decodes a code for a field-coded interlaced video frame. The frame has two fields, and the code represents information that jointly indicates field types for the two fields and an order for the field types. For example, the code is a fixed length code signaled at frame layer for the frame.

Or, a tool such as a video encoder encodes and signals a code for a field-coded interlaced video frame. The frame has two fields, and the code represents information that jointly indicates field types for the two fields and an order for the field types.

The various techniques and tools can be used in combination or independently.

Additional features and advantages will be made apparent from the following detailed description of different embodiments that proceeds with reference to the accompanying drawings.

BRIEF DESCRIPTION OF THE DRAWINGS

FIG. 1 is a diagram showing an interlaced frame according to the prior art.

FIGS. 2A and 2B are code tables used for signaling frame type information according to the prior art.

FIG. 3 is a block diagram of a suitable computing environment in conjunction with which several described embodiments may be implemented.

FIGS. 10A-10C are tables for codes in the combined implementation.

DETAILED DESCRIPTION

Figure 4:
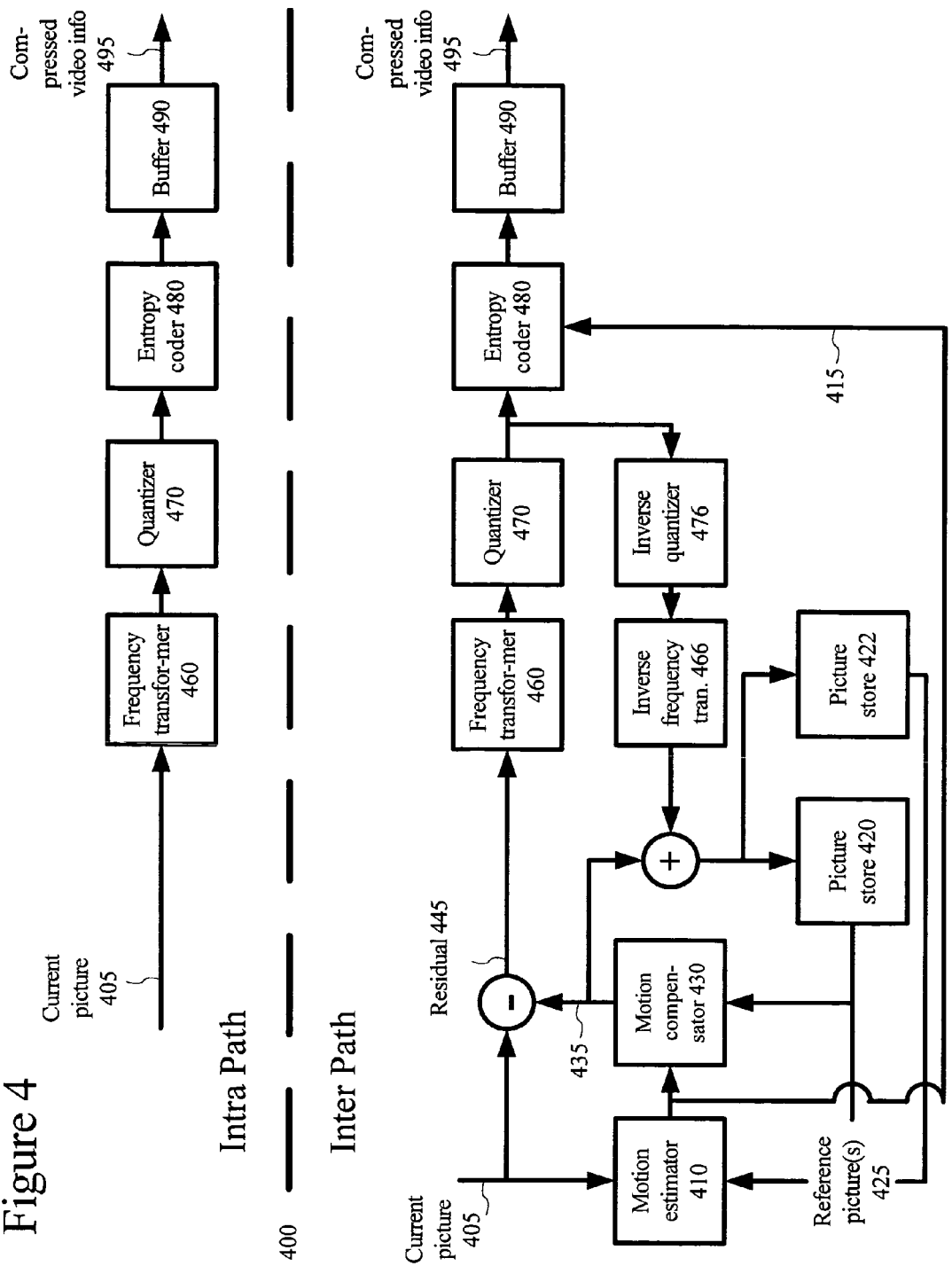
FIG. 4 is a block diagram of a generalized video encoder system in conjunction with which several described embodiments may be implemented.

The present application relates to techniques and tools for efficient compression and decompression of interlaced video. Compression and decompression of interlaced video content are improved with various techniques and tools that are specifically designed to deal with the particular properties of interlaced video representation. In various described embodiments, a video encoder and decoder incorporate techniques for encoding and decoding interlaced fields, along with corresponding signaling techniques for use with a bitstream format or syntax comprising different layers or levels (e.g., sequence level, frame level, field level, slice level, macroblock level, and/or block level).

Interlaced video content is commonly used in digital video broadcasting systems, whether over cable, satellite, or DSL. Efficient techniques and tools for compressing and decompressing interlaced video content are important parts of a video codec. Field coding of interlaced video content is important for interoperability with standards such as MPEG-2 and H.264.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

In various embodiments, an encoder and decoder use flags and/or signals in a bitstream. While specific flags and signals are described, it should be understood that this manner of description encompasses different conventions (e.g., 0s rather than 1s) for the flags and signals.

The various techniques and tools can be used in combination or independently. Different embodiments implement one or more of the described techniques and tools. Some techniques and tools described herein can be used in a video encoder or decoder, or in some other system not specifically limited to video encoding or decoding.

I. Computing Environment

FIG. 3 illustrates a generalized example of a suitable computing environment (300) in which several of the described embodiments may be implemented. The computing environment (300) is not intended to suggest any limitation as to scope of use or functionality, as the techniques and tools may be implemented in diverse general-purpose or special-purpose computing environments.

With reference to FIG. 3, the computing environment (300) includes at least one processing unit (310) and memory (320). In FIG. 3, this most basic configuration (330) is included within a dashed line. The processing unit (310) executes computer-executable instructions and may be a real or a virtual processor. In a multi-processing system, multiple processing units execute computer-executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing a video encoder and/or decoder with joint signaling of field types for both fields of an interlaced video frame.

A computing environment may have additional features. For example, the computing environment (300) includes storage (340), one or more input devices (350), one or more output devices (360), and one or more communication connections (370). An interconnection mechanism (not shown) such as a bus, controller, or network interconnects the components of the computing environment (300). Typically, operating system software (not shown) provides an operating environment for other software executing in the computing environment (300), and coordinates activities of the components of the computing environment (300).

The storage (340) may be removable or non-removable, and includes magnetic disks, magnetic tapes or cassettes, CD-ROMs, DVDs, or any other medium which can be used to store information and which can be accessed within the computing environment (300). The storage (340) stores instructions for the software (380) implementing the video encoder or decoder.

The input device(s) (350) may be a touch input device such as a keyboard, mouse, pen, or trackball, a voice input device, a scanning device, or another device that provides input to the computing environment (300). For audio or video encoding, the input device(s) (350) may be a sound card, video card, TV tuner card, or similar device that accepts audio or video input in analog or digital form, or a CD-ROM or CD-RW that reads audio or video samples into the computing environment (300). The output device(s) (360) may be a display, printer, speaker, CD-writer, or another device that provides output from the computing environment (300).

The communication connection(s) (370) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "signal," "determine," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 5:
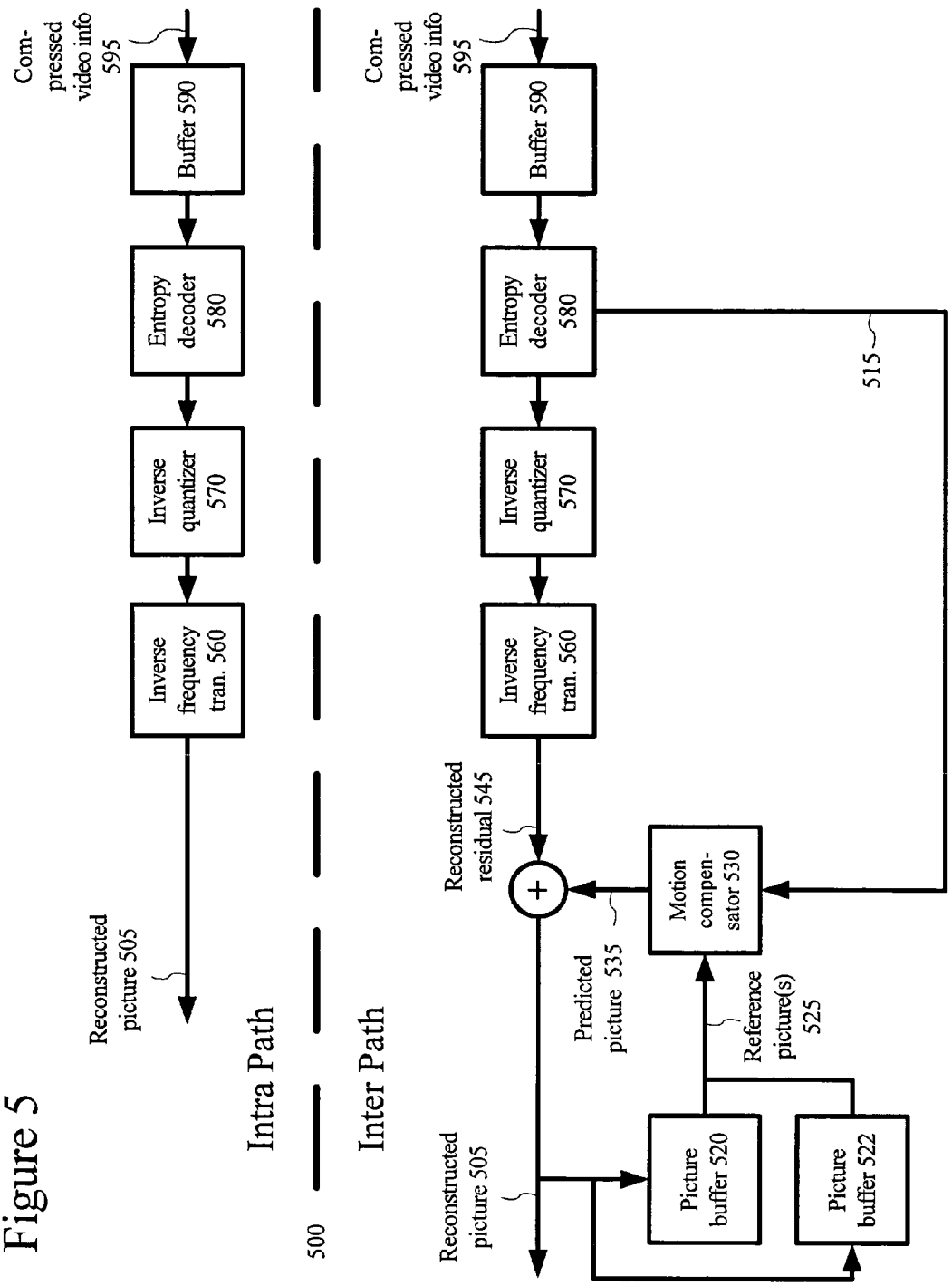
FIG. 5 is a block diagram of a generalized video decoder system in conjunction with which several described embodiments may be implemented.

FIG. 4 is a block diagram of a generalized video encoder system (400), and FIG. 5 is a block diagram of a generalized video decoder system (500), in conjunction with which various described embodiments may be implemented.

The relationships shown between modules within the encoder and decoder indicate the main flow of information in the encoder and decoder; other relationships are not shown for the sake of simplicity. In particular, FIGS. 4 and 5 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (400) and decoder (500) process video pictures, which may be video frames, video fields or combinations of frames and fields. The bitstream syntax and semantics at the picture and macroblock levels may depend on whether frames or fields are used. There may be changes to macroblock organization and overall timing as well. The encoder (400) and decoder (500) are block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in the next section.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder (400) and decoder (500) process video frames organized as follows. A frame contains lines of spatial information of a video signal. For progressive video, these lines contain samples starting from one time instant and continuing through successive lines to the bottom of the frame. A progressive video frame is divided into macroblocks such as the macroblock (600) shown in FIG. 6. The macroblock (600) includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame. A progressive P-frame is a progressive video frame coded using forward prediction, and a progressive B-frame is a progressive video frame coded using bi-directional prediction. Progressive P- and B-frames may include intra-coded macroblocks as well as different types of predicted macroblocks.

Figure 7A:
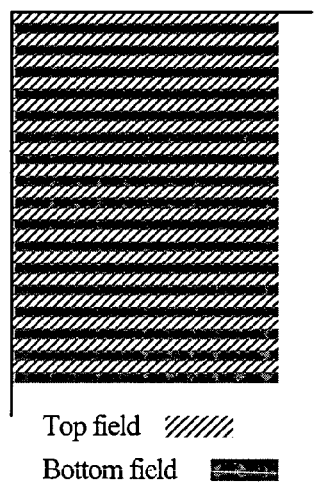
FIG. 7A is a diagram of part of an interlaced video frame, showing alternating lines of a top field and a bottom field.

An interlaced video frame consists of two scans of a frame—one comprising the even lines of the frame (the top field) and the other comprising the odd lines of the frame (the bottom field). The two fields may represent two different time periods or they may be from the same time period. FIG. 7A shows part of an interlaced video frame (700), including the alternating lines of the top field and bottom field at the top left part of the interlaced video frame (700).

Figure 6:
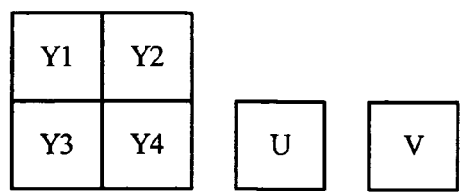
FIG. 6 is a diagram of a macroblock format used in several described embodiments.
Figure 7B:
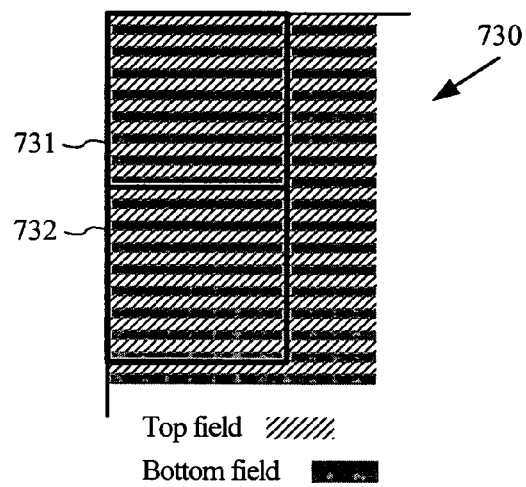
FIG. 7B is a diagram of the interlaced video frame organized for encoding/decoding as a frame.

FIG. 7B shows the interlaced video frame (700) of FIG. 7A organized for encoding/decoding as a frame (730). The interlaced video frame (700) has been partitioned into macroblocks such as the macroblocks (731) and (732), which use a 4:2:0 format as shown in FIG. 6. In the luminance plane, each macroblock (731, 732) includes 8 lines from the top field alternating with 8 lines from the bottom field for 16 lines total, and each line is 16 pixels long. (The actual organization and placement of luminance blocks and chrominance blocks within the macroblocks (731, 732) are not shown, and in fact may vary for different encoding decisions.) Within a given macroblock, the top-field information and bottom-field information may be coded jointly or separately at any of various phases. An interlaced I-frame is two intra-coded fields of an interlaced video frame, where a macroblock includes information for the two fields. An interlaced P-frame is two fields of an interlaced video frame coded using forward prediction, and an interlaced B-frame is two fields of an interlaced video frame coded using bi-directional prediction, where a macroblock includes information for the two fields. Interlaced P and B-frames may include intra-coded macroblocks as well as different types of predicted macroblocks.

Figure 7C:
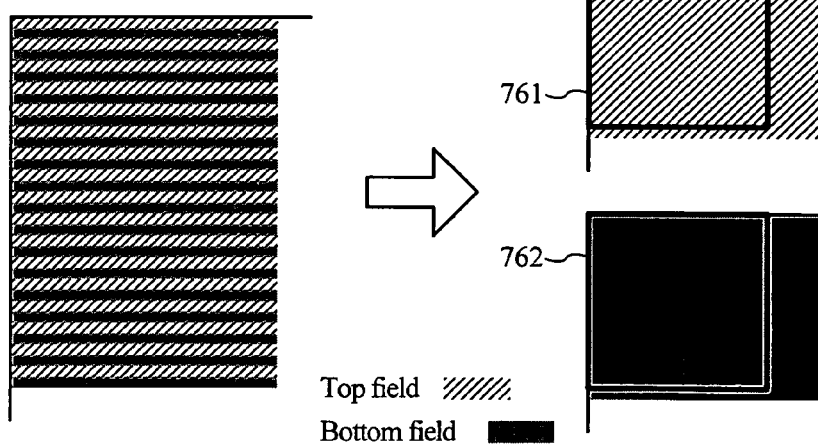
FIG. 7C is a diagram of the interlaced video frame organized for encoding/decoding as fields.

FIG. 7C shows the interlaced video frame (700) of FIG. 7A organized for encoding/decoding as fields (760). Each of the two fields of the interlaced video frame (700) is partitioned into macroblocks. The top field is partitioned into macroblocks such as the macroblock (761), and the bottom field is partitioned into macroblocks such as the macroblock (762). (Again, the macroblocks use a 4:2:0 format as shown in FIG. 6, and the organization and placement of luminance blocks and chrominance blocks within the macroblocks are not shown.) In the luminance plane, the macroblock (761) includes 16 lines from the top field and the macroblock (762) includes 16 lines from the bottom field, and each line is 16 pixels long. An interlaced I-field is a single, separately represented intra-coded field of an interlaced video frame. An interlaced P-field is a single, separately represented field of an interlaced video frame coded using forward prediction, and an interlaced B-field is a single, separately represented field of an interlaced video frame coded using bi-directional prediction. Interlaced P- and B-fields may include intra-coded macroblocks as well as different types of predicted macroblocks.

The term picture generally refers to source, coded or reconstructed image data. For progressive video, a picture is a progressive video frame. For interlaced video, a picture may refer to an interlaced video frame, the top field of the frame, or the bottom field of the frame, depending on the context.

Alternatively, the encoder (400) and decoder (500) are object-based, use a different macroblock or block format, or perform operations on sets of pixels of different size or configuration than 8×8 blocks and 16×16 macroblocks.

B. Video Encoder

FIG. 4 is a block diagram of a generalized video encoder system (400). The encoder system (400) receives a sequence of video pictures including a current picture (405) (e.g., progressive video frame, interlaced video frame, or field of an interlaced video frame), and produces compressed video information (495) as output. Particular embodiments of video encoders typically use a variation or supplemented version of the generalized encoder (400).

The encoder system (400) compresses predicted pictures and key pictures. For the sake of presentation, FIG. 4 shows a path for key pictures through the encoder system (400) and a path for forward-predicted pictures. Many of the components of the encoder system (400) are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures. A prediction residual is the difference between what was predicted and the original picture. In contrast, a key picture (also called an I-picture or intra-coded picture) is compressed without reference to other pictures.

If the current picture (405) is a forward-predicted picture, a motion estimator (410) estimates motion of macroblocks or other sets of pixels of the current picture (405) with respect to a reference picture, which is a reconstructed previous picture (425) buffered in the picture store (420). In alternative embodiments, the reference picture is a later picture or the current picture is bi-directionally predicted. The motion estimator (410) can estimate motion by pixel, ½ pixel, ¼ pixel, or other increments, and can switch the precision of the motion estimation on a picture-by-picture basis or other basis. The precision of the motion estimation can be the same or different horizontally and vertically. The motion estimator (410) outputs as side information motion information (415) such as motion vectors. A motion compensator (430) applies the motion information (415) to the reconstructed previous picture (425) to form a motion-compensated current picture (435). The prediction is rarely perfect, however, and the difference between the motion-compensated current picture (435) and the original current picture (405) is the prediction residual (445). Alternatively, a motion estimator and motion compensator apply another type of motion estimation/compensation.

A frequency transformer (460) converts the spatial domain video information into frequency domain (i.e., spectral) data. For block-based video pictures, the frequency transformer (460) applies a DCT or variant of DCT to blocks of the pixel data or prediction residual data, producing blocks of DCT coefficients. Alternatively, the frequency transformer (460) applies another conventional frequency transform such as a Fourier transform or uses wavelet or subband analysis. The frequency transformer (460) applies an 8×8, 8×4, 4×8, or other size frequency transform (e.g., DCT) to prediction residuals for predicted pictures.

A quantizer (470) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (400) can use frame dropping, adaptive filtering, or other techniques for rate control.

If a given macroblock in a predicted picture has no information of certain types (e.g., no motion information for the macroblock and no residual information), the encoder (400) may encode the macroblock as a skipped macroblock. If so, the encoder signals the skipped macroblock in the output bitstream of compressed video information (495).

When a reconstructed current picture is needed for subsequent motion estimation/compensation, an inverse quantizer (476) performs inverse quantization on the quantized spectral data coefficients. An inverse frequency transformer (466) then performs the inverse of the operations of the frequency transformer (460), producing a reconstructed prediction residual (for a predicted picture) or reconstructed samples (for an intra-coded picture). If the picture (405) being encoded is an intra-coded picture, then the reconstructed samples form the reconstructed current picture (not shown). If the picture (405) being encoded is a predicted picture, the reconstructed prediction residual is added to the motion-compensated predictions (435) to form the reconstructed current picture. The picture store (420) buffers the reconstructed current picture for use in predicting a next picture. The encoder may apply a deblocking filter to adaptively smooth discontinuities between blocks.

The entropy coder (480) compresses the output of the quantizer (470) as well as certain side information (e.g., motion information (415), quantization step size). Typical entropy coding techniques include arithmetic coding, differential coding, Huffman coding, run length coding, LZ coding, dictionary coding, and combinations of the above. The entropy coder (480) typically uses different coding techniques for different kinds of information (e.g., DC coefficients, AC coefficients, different kinds of side information), and can choose from among multiple code tables within a particular coding technique.

The entropy coder (480) puts compressed video information (495) in the buffer (490). A buffer level indicator is fed back to bit rate adaptive modules. The compressed video information (495) is depleted from the buffer (490) at a constant or relatively constant bit rate and stored for subsequent streaming at that bit rate. Therefore, the level of the buffer (490) is primarily a function of the entropy of the filtered, quantized video information, which affects the efficiency of the entropy coding. Alternatively, the encoder system (400) streams compressed video information immediately following compression, and the level of the buffer (490) also depends on the rate at which information is depleted from the buffer (490) for transmission.

Before or after the buffer (490), the compressed video information (495) can be channel coded for transmission over the network. The channel coding can apply error detection and correction data to the compressed video information (495).

C. Video Decoder

FIG. 5 is a block diagram of a generalized video decoder system (500). The decoder system (500) receives information (595) for a compressed sequence of video pictures and produces output including a reconstructed picture (505) (e.g., progressive video frame, interlaced video frame, or field of an interlaced video frame). Particular embodiments of video decoders typically use a variation or supplemented version of the generalized decoder (500).

The decoder system (500) decompresses predicted pictures and key pictures. For the sake of presentation, FIG. 5 shows a path for key pictures through the decoder system (500) and a path for forward-predicted pictures. Many of the components of the decoder system (500) are used for decompressing both key pictures and predicted pictures. The exact operations performed by those components can vary depending on the type of information being decompressed.

A buffer (590) receives the information (595) for the compressed video sequence and makes the received information available to the entropy decoder (580). The buffer (590) typically receives the information at a rate that is fairly constant over time, and includes a jitter buffer to smooth short-term variations in bandwidth or transmission. The buffer (590) can include a playback buffer and other buffers as well. Alternatively, the buffer (590) receives information at a varying rate. Before or after the buffer (590), the compressed video information can be channel decoded and processed for error detection and correction.

The entropy decoder (580) entropy decodes entropy-coded quantized data as well as entropy-coded side information (e.g., motion information (515), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (580) frequently uses different decoding techniques for different kinds of information (e.g., DC coefficients, AC coefficients, different kinds of side information), and can choose from among multiple code tables within a particular decoding technique.

If the picture (505) to be reconstructed is a forward-predicted picture, a motion compensator (530) applies motion information (515) to a reference picture (525) to form a prediction (535) of the picture (505) being reconstructed. For example, the motion compensator (530) uses a macroblock motion vector to find a macroblock in the reference picture (525). A picture buffer (520) stores previous reconstructed pictures for use as reference pictures. The motion compensator (530) can compensate for motion at pixel, ½ pixel, ¼ pixel, or other increments, and can switch the precision of the motion compensation on a picture-by-picture basis or other basis. The precision of the motion compensation can be the same or different horizontally and vertically. Alternatively, a motion compensator applies another type of motion compensation. The prediction by the motion compensator is rarely perfect, so the decoder (500) also reconstructs prediction residuals.

An inverse quantizer (570) inverse quantizes entropy-decoded data. In general, the inverse quantizer applies uniform, scalar inverse quantization to the entropy-decoded data with a step-size that varies on a picture-by-picture basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (560) converts the quantized, frequency domain data into spatial domain video information. For block-based video pictures, the inverse frequency transformer (560) applies an IDCT or variant of IDCT to blocks of the DCT coefficients, producing pixel data or prediction residual data for key pictures or predicted pictures, respectively. Alternatively, the frequency transformer (560) applies another conventional inverse frequency transform such as a Fourier transform or uses wavelet or subband synthesis. The inverse frequency transformer (560) applies an 8×8, 8×4, 4×8, or other size inverse frequency transform (e.g., IDCT) to prediction residuals for predicted pictures.

When the decoder needs a reconstructed picture for subsequent motion compensation, the picture store (520) buffers the reconstructed picture for use in predicting a next picture. The decoder may apply a deblocking filter to adaptively smooth discontinuities between blocks.

III. Signaling Field Type Information for Field-coded Interlaced Video Frames In some embodiments, an encoder and decoder use a signaling mechanism in which a code jointly indicates the field types and temporal sequence for both fields (i.e., the top field and bottom field) of a field-coded interlaced video frame. Compared to signaling mechanisms in which type information is signaled separately per field, joint signaling of field types and order more efficiently represents the field type information.

A. Joint Signaling of Field Types and Order Information

Examples of joint signaling of field types and order information for both fields of an interlaced video frame are provided. Alternatively, an encoder (or decoder) jointly codes (or decodes) such information in conjunction with another mechanism.

In general, the signaling mechanisms use codes that jointly indicate field types and temporal sequence information for both fields of field-coded interlaced video frames. A set of codes addresses the allowable orderings of fields for field-coded interlaced video frames. The codes themselves may be FLCs or VLCs.

In one implementation, there are eight allowable orderings for fields in an interlaced video frame. The allowable combinations are I/I, I/P, P/I, P/P, B/B, B/BI, BI/B, and BI/BI, where I indiates an interlaced I-field, P indicates an interlaced P-field, B indicates an interlaced B-field, and BI indicates an interlaced BI-field. Thus, I/P indicates, for example, an interlaced I-field is the first field and an interlaced P-field is the second field of an interlaced video frame.

In this implementation, the signaling mechanism uses a three-bit FLC per field-coded interlaced video frame to represent the field types and ordering for the frame. The three-bit FLC is sent at frame level as part of the frame header for the frame. Field type information is not repeated for each individual field. FIG. 10B shows a FLC table used for a three-bit syntax element field picture type FPTYPE, signaled in the picture header for a field-coded interlaced video frame, in the combined implementation detailed below. Alternatively, a signaling mechanism uses VLCs for the field types and ordering information, addresses more or fewer field types or ordering combinations, and/or addresses different field types or ordering combinations.

B. Field Type Information Signaling Techniques

An encoder such as the encoder (400) of FIG. 4 jointly signals field type information for both fields of a field-coded interlaced video frame. For example, the encoder performs the technique (800) shown in FIG. 8A.

For a video frame, the encoder first encodes and signals (810) a frame coding mode. For example, the frame coding mode is progressive video frame, frame-coded interlaced video frame, or field-coded interlaced video frame. FIG. 10A shows VLCs for frame coding mode in one implementation. Alternatively, the encoder uses different codes and/or signals other or additional frame coding modes.

The encoder then determines (812) whether or not the frame is field-coded. If so (the "yes" path out of the decision 812), the encoder encodes and signals (820) a field type sequence for the two fields of the frame. For example, the encoder signals a code that jointly indicates a field type (such as I, P, B, or BI) per field for the first and second fields of the frame. FIG. 10B shows FLCs for field picture types in one implementation. Alternatively, the encoder uses different codes and/or signals other or additional field type sequences. The encoder then encodes (822) the fields of the frame. The details of the encoding of the fields depend on implementation.

If the video frame is not field-coded (the "no" path out of the decision 812), the encoder encodes and signals (830) a frame type for the video frame. For example, the frame type is I, P, B, or BI. FIG. 10C shows VLCs for picture types for progressive video frames and frame-coded interlaced video frames in one implementation. Alternatively, the encoder uses different codes and/or signals other or additional frame types. The encoder then encodes (832) the video frame. The details of the frame encoding depend on implementation.

The encoder determines (840) whether or not to continue with the next frame. If so (the "yes" path out of decision 840), the encoder continues by signaling (810) a frame coding mode for the next frame. Otherwise (the "no" path out of decision 840), the technique (800) ends.

Alternatively, field type information is jointly signaled with another mechanism. For example, if only field-coded interlaced video frames are allowed, field type information is signaled jointly for both fields per frame without signaling of frame coding mode and frame type information.

Figure 8B:
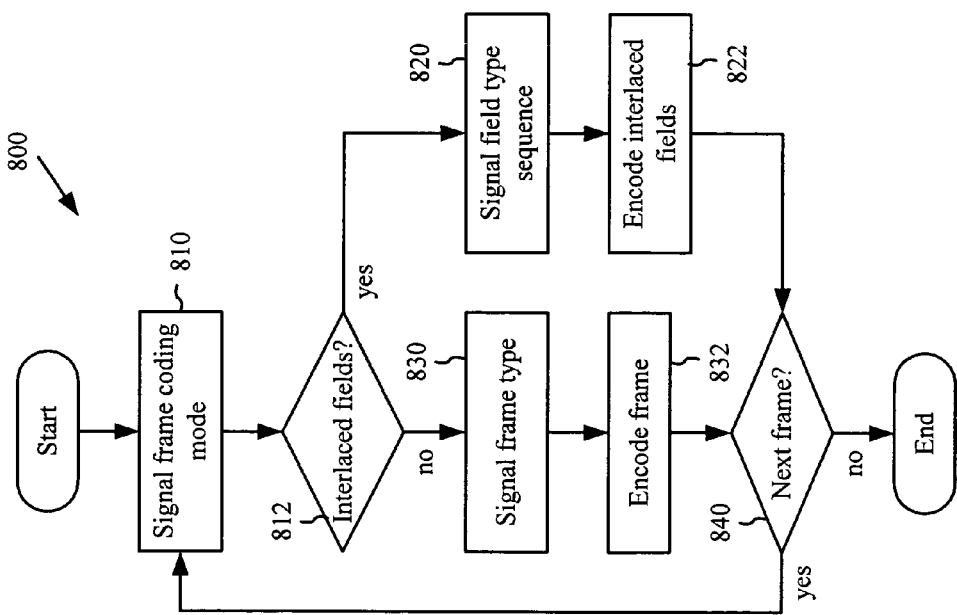
FIGS. 8A and 8B are flowcharts showing techniques for signaling and receiving signals for, respectively, field type information for interlaced video frames.
Figure 8A:
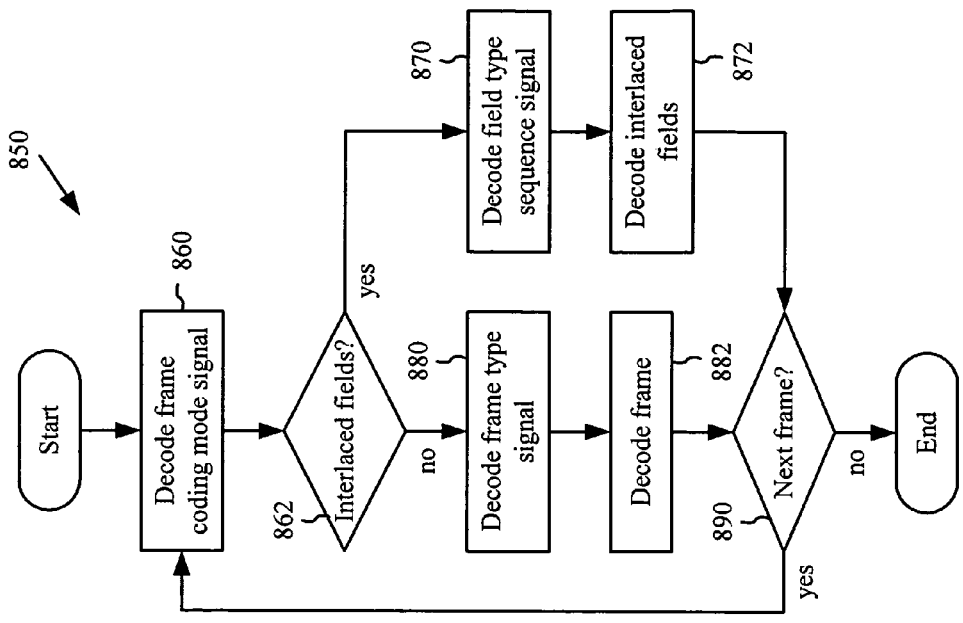

For the sake of simplicity, FIG. 8A does not show the various ways in which the technique (800) may be integrated with other aspects of encoding and decoding. For example, FIG. 8A does not show many syntax elements for frames or fields and does not show details concerning the encoding of frames and fields.

C. Field Type Information Decoding Techniques

A decoder such as the decoder (500) of FIG. 5 decodes field type information jointly signaled for both fields of a field-coded interlaced video frame. For example, the decoder performs the technique (850) shown in FIG. 8B.

For a video frame, the decoder first receives and decodes (860) a frame coding mode signal. For example, the frame coding mode is progressive video frame, frame-coded interlaced video frame, or field-coded interlaced video frame. FIG. 10A shows VLCs for frame coding mode in one implementation. Alternatively, the decoder works with different codes and/or decodes other or additional frame coding mode signals.

The decoder then determines (862) whether or not the frame is field-coded. If so (the "yes" path out of the decision 862), the decoder receives and decodes (870) a field type sequence for the two fields of the frame. For example, the decoder decodes a signal that jointly indicates field type (such as I, P, B, or BI) per field for the first and second fields of the frame. FIG. 10B shows FLCs for field picture types in one implementation. Alternatively, the decoder works with different codes and/or decodes other or additional field type sequence signals. The decoder then decodes (872) the fields of the frame. The details of the decoding of the fields depend on implementation.

If the video frame is not field-coded (the "no" path out of the decision 862), the decoder receives and decodes (880) a frame type signal for the video frame. For example, the frame type is I, P, B, or BI. FIG. 10C shows VLCs for picture types for progressive video frames and frame-coded interlaced video frames in one implementation. Alternatively, the decoder works with different codes and/or decodes other or additional frame type signals. The decoder then decodes (882) the video frame. The details of the frame decoding depend on implementation.

The decoder determines (890) whether or not to continue with the next frame. If so (the "yes" path out of decision 890), the decoder continues by receiving and decoding (860) a frame coding mode signal for the next frame. Otherwise (the "no" path out of decision 890), the technique (850) ends.

Alternatively, field type information received and decoded with another mechanism. For example, if only field-coded interlaced video frames are allowed, field type information is decoded jointly for both fields per frame without receiving and decoding frame coding mode and frame type information.

For the sake of simplicity, FIG. 8B does not show the various ways in which the technique (850) may be integrated with other aspects of encoding and decoding. For example, FIG. 8B does not show many syntax elements for frames or fields and does not show details concerning the decoding of frames or fields.

V. Combined Implementation

A detailed combined implementation for a bitstream syntax, semantics, and decoder is now described. In particular, the syntax elements, semantics, and decoding for field type information are addressed.

A. Sequence and Semantics in the Combined Implementation

In the combined implementation, a compressed video sequence is made up of data structured into hierarchical layers: the picture layer, macroblock layer, and block layer. A sequence header precedes the sequence, and entry point headers may be interspersed in the sequence.

1. Sequence-Layer Syntax and Semantics

A sequence-level header contains sequence-level parameters used to decode the sequence of compressed pictures. In some profiles, sequence-related metadata is communicated to the decoder by the transport layer or other means. For the profile with interlaced I-fields, P-fields, B-fields, and BI-fields (the advanced profile), however, this header syntax is part of the video data bitstream.

Figure 9A:
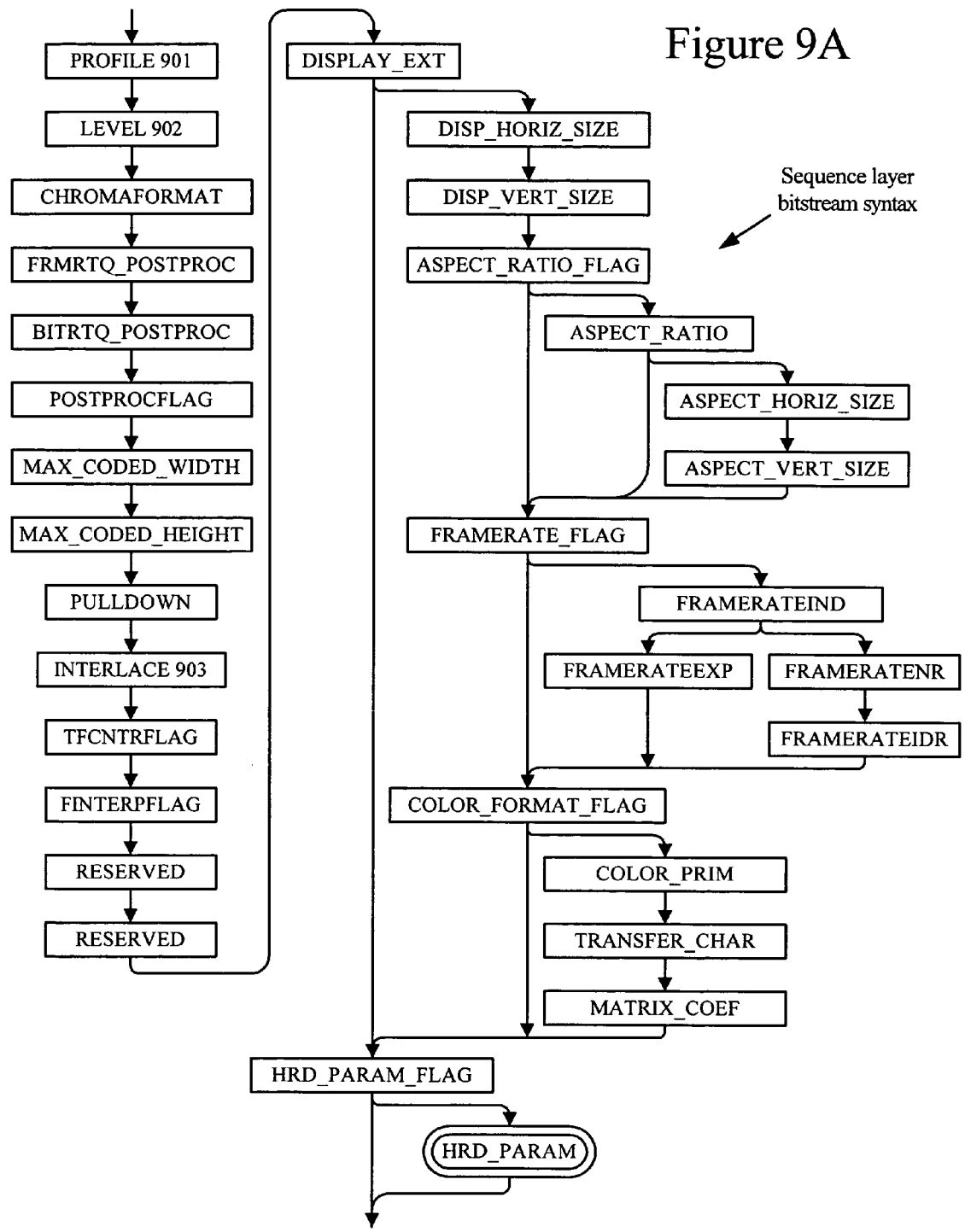
FIGS. 9A and 9B are syntax diagrams for layers of a bitstream according to a combined implementation.

FIG. 9A shows the syntax elements that make up the sequence header for the advanced profile. The PROFILE (901) and LEVEL (902) elements specify the profile used to encode the sequence and the encoding level in the profile, respectively. The INTERLACE (903) element is a one-bit syntax element that signals whether the source content is progressive (INTERLACE=0) or interlaced (INTERLACE=1). Individual frames may still be coded using the progressive or interlaced syntax when INTERLACE=1.

2. Entry-Point-Layer Syntax and Semantics

Entry-point headers are allowed in the advanced profile. An entry point has two purposes. First, it is used to signal a random access point within the bitstream. Second, it is used to signal changes in the coding control parameters.

3. Picture-Layer Syntax and Semantics

Figure 9B:
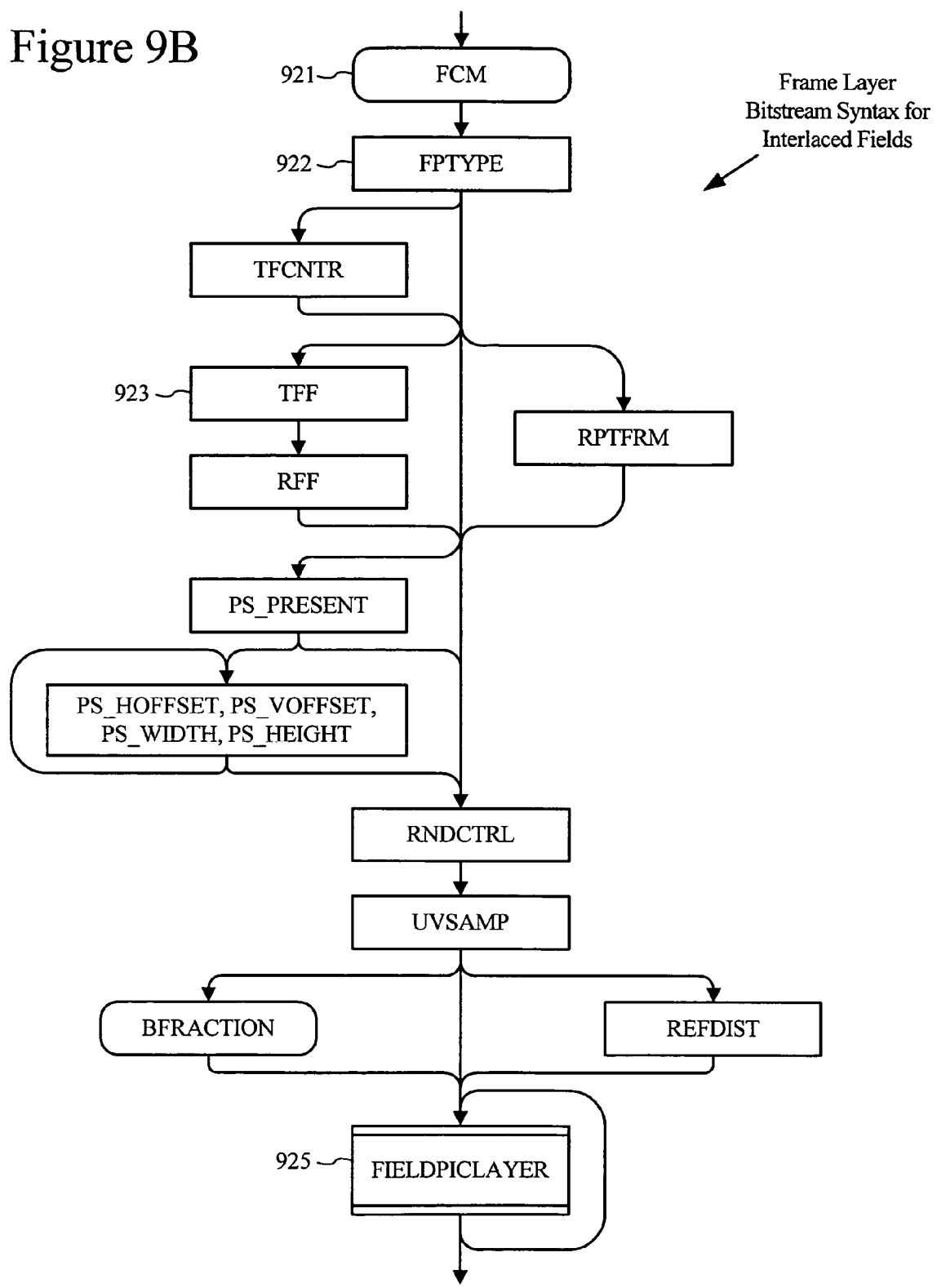

FIG. 9B shows the bitstream elements that make up the frame header for interlaced field pictures. The header shown in FIG. 9B is applicable to various combinations of interlaced I-, P-, B-, and BI-fields.

The frame coding mode FCM (921) element is present only in the advanced profile and only if the sequence layer INTERLACE (903) has the value 1. FCM (921) indicates whether the picture is coded as progressive, interlace-field or interlace-frame. The table in FIG. 10A shows the VLCs used to indicate FCM.

The field picture type FPTYPE (922) element is a three-bit syntax element present in frame headers for interlaced field pictures. FPTYPE is decoded according to the table in FIG. 10B. As the table shows, a field-coded interlaced frame may include two interlaced I-fields, a first interlaced I-field and second interlaced P-field, a first interlaced P-field and second interlaced I-field, two interlaced P-fields, two interlaced B-fields, a first interlaced B-field and second interlaced BI-field, a first interlaced BI-field and second interlaced B-field, or two interlaced BI-fields.

The top field first TFF (923) element is a one-bit element signaled for some interlaced frames. If TFF (923) is 1, the top field of the interlaced frame is the first decoded field. If TFF (923) is 0, the bottom field of the interlaced frame is the first decoded field. If TFF (923) is not signaled, its value is set to 1.

The field picture layer FIELDPICLAYER (925) element is data for one of the separate interlaced fields of the field-coded interlaced frame. If the interlaced frame is a P/P frame (FPTYPE=011), for example, the bitstream includes two FIELDPICLAYER (925) elements for the two interlaced P-fields, respectively. The bitstream elements that make up FIELDPICLAYER (925) for an interlaced I-field, P-field, B-field, or BI-field (not shown) depend on the field picture type.

For the various types of frame-coded interlaced video frames, a frame header (not shown) includes the FCM element but not the FPTYPE element. Instead, the frame header has a picture type PTYPE element. PTYPE is decoded according to the table in FIG. 10C. The bitstream elements that make up the frame header for an interlaced I-frame, P-frame, B-frame, or BI-frame (not shown) depend on the picture type.

For the various types of progressive video frames, a frame header (not shown) also includes the PTYPE element. The PTYPE element is preceded by the FCM element if the sequence-layer INTERLACE (903) has the value 1. PTYPE is decoded according to the table in FIG. 10C. The bitstream elements that make up the frame header for a progressive I-frame, P-frame, B-frame, or BI-frame (not shown) depend on the picture type.

4. Macroblock and Block-Layer Syntax and Semantics

Data for a macroblock consists of a macroblock header followed by the block layer. The bitstream elements that make up the macroblock and block layers are not shown.

B. Decoding in the Combined Implementation

When a video sequence consists of interlaced video frames or includes a mix of interlaced and progressive video frames, the FCM (921) element indicates whether a given frame is coded as a progressive frame, interlaced fields or an interlaced frame. For a frame coded as two interlaced fields, FPTYPE (922) indicates whether the frame includes two interlaced I-fields, a first interlaced I-field and second interlaced P-field, a first interlaced P-field and second interlaced I-field, two interlaced P-fields, two interlaced B-fields, a first interlaced B-field and second interlaced BI-field, a first interlaced BI-field and second interlaced B-field, or two interlaced BI-fields. Decoding of the interlaced fields follows. For additional details on the decoding of interlaced fields of field-coded interlaced video frames, see U.S. Provisional Patent Application No. 60/501,081.

For a progressive frame or frame-coded interlaced video frame, PTYPE indicates the picture type for the frame (e.g., I, P, B, or BI). Decoding of the frame follows. For additional details on the decoding of progressive video frames and frame-coded interlaced video frames, see U.S. Provisional Patent Application No. 60/501,081.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. In a computing device that implements a video decoder, a method of decoding video comprising:
    receiving, at the video decoder, a first code from a bit stream, wherein the first code indicates a frame coding mode of a video frame, and wherein the first code indicates that the frame coding mode for the video frame is field-coded interlaced;
    receiving, at the video decoder, a second code from the bit stream for the field-coded interlaced video frame, wherein the field-coded interlaced video frame has two fields arranged in the bit stream for decoding as individual fields; and
    with the video decoder, decoding the second code, wherein the second code represents information that jointly indicates two separate field types for the two fields, respectively, and an order for the two separate field types for the two fields, and wherein each of the two separate field types is capable of being any of an intra-coded field (I), a predictive-coded field (P), a bi-directionally predictive-coded field (B), and a bi-directionally predictive-coded field with only intra-coded macroblocks (BI);
    wherein the decoding the second code comprises looking up the second code in a table that maps different second code values to different combinations of the two separate field types.

2. The method of claim 1 wherein the order for the two separate field types is selected from the group consisting of I/I, I/P, P/I, P/P, B/B, B/BI, BI/B, and BI/BI.

3. The method of claim 1 wherein the second code is signaled at frame layer for the interlaced video frame.

4. The method of claim 1 wherein the second code is a fixed length code.

5. The method of claim 1 wherein the frame coding mode is selected from the group consisting of: progressive, frame-coded interlaced, and field-coded interlaced.

6. The method of claim 1 wherein the first code is a variable length code.

7. The method of claim 1 wherein the first code is signaled at frame layer for the field-coded interlaced video frame.

8. The method of claim 1 wherein the computing device includes a display and a wireless communication connection, the bit stream being received over the wireless communication connection.

9. In a computing device that implements a video encoder, a method of encoding video comprising:
- with the video encoder, encoding a first code for a video frame, wherein the first code indicates a frame coding mode of the video frame, and wherein the first code indicates that the frame coding mode for the video frame is field-coded interlaced;
- with the video encoder, encoding a second code for the field-coded interlaced video frame, wherein the field-coded interlaced video frame has two fields arranged in a bit stream for decoding as individual fields, wherein the second code represents information that jointly indicates two separate field types for the two fields, respectively, and an order for the two separate field types for the two fields, and wherein the two separate field types are capable of having two different field types; and
- with the video encoder, signaling the first code and the second code in the bit stream.

10. The method of claim 9 wherein the order for the two separate field types is selected from the group consisting of: I/I, I/P, P/I, P/P, B/B, B/BI, BI/B, and BI/BI.

11. The method of claim 9 wherein the second code is signaled at frame layer for the interlaced video frame.

12. The method of claim 9 wherein the second code is a fixed length code.

13. The method of claim 9 wherein the frame coding mode is selected from the group consisting of: progressive, frame-coded interlaced, and field-coded interlaced.

14. The method of claim 9 wherein the first code is a variable length code.

15. The method of claim 9 wherein the first code is signaled at frame layer for the interlaced video frame.

16. The method of claim 9 wherein the encoding the second code comprises looking up a combination for the two separate field types for the two fields in a table that maps different second code values to different combinations of the two separate field types.

17. The method of claim 9 wherein the computing device includes a display and a wireless communication connection, the bit stream being signaled over the wireless communication connection.

18. A system that implements a video decoder, the system comprising:
- one or more processors;
- memory;
- at least one input device, output device or communication connection; and
- one or more storage media storing instructions for causing the system to decode video using:
  - means for decoding a frame coding mode syntax element signaled at frame layer for a video frame, wherein the frame coding mode syntax element indicates a frame coding mode for the video frame; and
  - means for decoding a field picture type syntax element signaled at frame layer for the video frame when the frame coding mode is field-coded interlaced, wherein the field picture type syntax element jointly indicates two separate field types for two fields, respectively, of the video frame and a field type sequence for the two fields of the video frame, wherein the two fields of the video frame are arranged in a bit stream for decoding as individual fields, and wherein the field type sequence is capable of being any of I/I, I/P, P/I, P/P, B/B, B/BI, BI/B, and BI/BI.

19. The system of claim 18 wherein the frame coding mode syntax element is a variable length code and the field picture type syntax element is a fixed length code.

20. The system of claim 18 wherein the one or more storage media further store instructions for causing the system to decode video using:
- means for decoding a picture type syntax element signaled at frame layer for the video frame when the frame coding mode is frame-coded interlaced or progressive, wherein the picture type syntax element indicates a picture type for the video frame.

21. A computing device that implements a video decoder, the computing device comprising:
- one or more processors;
- memory;
- a display
- a wireless communication connection; and
- one or more storage media storing instructions for causing the computing device to perform a method of decoding video comprising:
  - receiving, via the wireless communication connection, a bit stream;
  - decoding a frame coding mode syntax element signaled at frame layer in the bit stream for a video frame, wherein the frame coding mode syntax element indicates a frame coding mode for the video frame; and
  - decoding a field picture type syntax element signaled at frame layer in the bit stream for the video frame when the frame coding mode is field-coded interlaced, wherein the field picture type syntax element jointly indicates two separate field types for two fields, respectively, of the video frame and a field type sequence for the two fields of the video frame, wherein the two fields of the video frame are arranged in a bit stream for decoding as individual fields, and wherein the field type sequence is capable of being any of I/I, I/P, P/I, P/P, B/B, B/BI, BI/B, and BI/BI.

* * * * *